(12) United States Patent
Matsuda et al.

(10) Patent No.: US 7,524,070 B2
(45) Date of Patent: Apr. 28, 2009

(54) PROJECTION CONTROL SYSTEM, PROJECTOR AND PROJECTION CONTROL METHOD

(75) Inventors: Hideki Matsuda, Fujimi-machi (JP); Masanobu Kobayashi, Shiojiri (JP); Osamu Wada, Ina (JP)

(73) Assignee: Seiko Epson Corporation, Tokyo (JP)

( * ) Notice: Subject to any disclaimer, the term of this patent is extended or adjusted under 35 U.S.C. 154(b) by 467 days.

(21) Appl. No.: 11/319,269

(22) Filed: Dec. 29, 2005

(65) Prior Publication Data

US 2006/0152682 A1 Jul. 13, 2006

(30) Foreign Application Priority Data

Jan. 7, 2005 (JP) ............................. 2005-002311

(51) Int. Cl.
    *G03B 21/14* (2006.01)
(52) U.S. Cl. ........................ 353/70; 353/101; 353/121
(58) Field of Classification Search ................ 353/69, 353/70, 121, 101; 348/745–747
    See application file for complete search history.

(56) References Cited

U.S. PATENT DOCUMENTS

| | | | |
|---|---|---|---|
| 6,592,228 B1 * | 7/2003 | Kawashima et al. | 353/101 |
| 6,932,480 B2 * | 8/2005 | Wada et al. | 353/69 |
| 7,014,323 B2 * | 3/2006 | Kobayashi et al. | 353/69 |
| 7,108,379 B2 * | 9/2006 | Tan | 353/69 |
| 7,175,285 B2 * | 2/2007 | Li et al. | 353/70 |
| 7,233,707 B2 * | 6/2007 | Matsuda et al. | 382/275 |
| 7,270,422 B2 * | 9/2007 | Matsuda et al. | 353/70 |
| 7,322,701 B2 * | 1/2008 | Kamimura et al. | 353/69 |
| 7,347,564 B2 * | 3/2008 | Matsumoto et al. | 353/69 |
| 7,352,913 B2 * | 4/2008 | Karuta et al. | 382/275 |
| 7,401,929 B2 * | 7/2008 | Matsumoto et al. | 353/70 |
| 2005/0068501 A1 * | 3/2005 | Nonaka et al. | 353/30 |
| 2005/0105057 A1 * | 5/2005 | Matsuda et al. | 353/70 |
| 2005/0206859 A1 * | 9/2005 | Miyasaka | 353/122 |
| 2005/0213846 A1 * | 9/2005 | Matsuda et al. | 382/275 |
| 2005/0265713 A1 | 12/2005 | Matsuda et al. | |

FOREIGN PATENT DOCUMENTS

| | | |
|---|---|---|
| JP | A-2000-241874 | 9/2000 |
| JP | A-2004-341029 | 12/2004 |
| JP | A-2005-038388 | 2/2005 |
| JP | A-2005-039769 | 2/2005 |
| JP | A-2005-124131 | 5/2005 |
| JP | A-2005-341139 | 12/2005 |

\* cited by examiner

*Primary Examiner*—William C Dowling
(74) *Attorney, Agent, or Firm*—Oliff & Berridge, PLC

(57) ABSTRACT

A projector includes a projection angle deriving section which generates projection angle information indicating an angle formed by a projection target area and projection light projected onto the projection target area; a projection distance deriving section which generates projection distance information indicating a distance from an aim area in the projection target area to a projection section which projects the projection light; a control information generation section which generates direction control information for aligning a projection direction of the projection light with a normal direction of the projection target area based on the projection angle information, and generates projection section control information for controlling the projection section so that the projection light is projected onto the aim area based on the projection distance information; a pedestal driver section which drives a pedestal which adjusts the projection direction of the projection light based on the direction control information; a control section which controls the projection section based on the projection section control information; and the projection section.

8 Claims, 8 Drawing Sheets

PROJECTION CONTROL SYSTEM, PROJECTOR AND PROJECTION CONTROL METHOD

Japanese Patent Application No. 2005-2311, filed on Jan. 7, 2005, is hereby incorporated by reference in its entirety.

BACKGROUND OF THE INVENTION

The present invention relates to a projection control system, a projector, and a projection control method capable of deriving a projection angle based on sensing information and adjusting a projection direction or the like based on the projection angle.

When a projector projects an image onto a screen or the like, image distortion (keystone distortion) occurs depending on the angle formed by a projection target area on the screen or the like and projection light from the projector.

In this case, the projector performs image processing of eliminating image distortion by software correction.

The software correction can be performed at low cost, but causes the image quality to deteriorate.

Therefore, a method of eliminating image distortion by hardware correction has been proposed aiming at improving the image quality. In an automatic image position adjustment method for a projector disclosed in JP-A-2000-241874, a specific test pattern is projected onto a screen from a projector, the image of the test pattern projected onto the screen is sensed by using a monitor camera, and the image data of the sensed test pattern is analyzed to adjust the focus of the projector. The automatic image position adjustment method disclosed in JP-A-2000-241874 projects a quadrilateral solid white image onto the screen as the image of the test pattern, and detects the position of the screen in the solid white image sensed by using the monitor camera. The projected image is expanded or reduced by using a zooming function of the projection lens until the projected image reaches the detected endpoints of the screen, and the angle of elevation of the projection lens is adjusted to display the projected image at the center of the screen. The automatic image position adjustment method disclosed in JP-A-2000-241874 adjusts keystone distortion of the projected image by means of software or hardware (optically) by calculating the keystone distortion adjustment value from the positions of the endpoints of the screen and the positions of the endpoints of the solid white image.

However, processing takes time when using this method of adjusting the angle of view by expanding or reducing the projected image by using the zooming function of the projection lens until the projected image reaches the detected endpoints of the screen as disclosed in JP-A-2000-241874. Moreover, the method disclosed in JP-A-2000-241874 cannot be applied when the aspect ratio of the screen differs from the aspect ratio of the projected image. JP-A-2000-241874 adjusts the image display position by adjusting the angle of elevation of the projection lens so that the projected image is displayed at the center of the screen. However, JP-A-2000-241874 does not disclose detailed processing.

SUMMARY

A projection control system according to a first aspect of the invention comprises:

a projection angle deriving section which generates projection angle information indicating an angle formed by a projection target area and projection light projected onto the projection target area;

a projection distance deriving section which generates projection distance information indicating a distance from an aim area in the projection target area to a projection section which projects the projection light;

a control information generation section which generates direction control information for aligning a projection direction of the projection light with a normal direction of the projection target area based on the projection angle information, and generates projection section control information for controlling the projection section so that the projection light is projected onto the aim area based on the projection distance information;

a driver section which drives a direction adjustment mechanism which adjusts the projection direction of the projection light based on the direction control information; and a control section which controls the projection section based on the projection section control information.

A projector according to a second aspect of the invention comprises:

a projection angle deriving section which generates projection angle information indicating an angle formed by a projection target area and projection light projected onto the projection target area;

a projection distance deriving section which generates projection distance information indicating a distance from an aim area in the projection target area to a projection section which projects the projection light;

a control information generation section which generates direction control information for aligning a projection direction of the projection light with a normal direction of the projection target area based on the projection angle information, and generates projection section control information for controlling the projection section so that the projection light is projected onto the aim area based on the projection distance information;

a driver section which drives a direction adjustment mechanism which adjusts the projection direction of the projection light based on the direction control information;

a control section which controls the projection section based on the projection section control information; and the projection section.

A computer-readable program according to a third aspect of the invention causes a computer to function as:

a projection angle deriving section which generates projection angle information indicating an angle formed by a projection target area and projection light projected onto the projection target area;

a projection distance deriving section which generates projection distance information indicating a distance from an aim area in the projection target area to a projection section which projects the projection light;

a control information generation section which generates direction control information for aligning a projection direction of the projection light with a normal direction of the projection target area based on the projection angle information, and generates projection section control information for controlling the projection section so that the projection light is projected onto the aim area based on the projection distance information;

a driver section which drives a direction adjustment mechanism which adjusts the projection direction of the projection light based on the direction control information; and a control section which controls the projection section based on the projection section control information.

An information storage medium according to a fourth aspect of the invention stores a computer-readable program, the information storage medium storing the above program.

A projection control method according to a fifth aspect of the invention comprises:

causing a projection section to perform autofocus processing for an aim area in a projection target area;

causing a processing section to generate projection distance information indicating a distance from the projection section to the aim area based on an amount of focus adjustment in the autofocus processing;

causing a sensing section to generate sensing information by sensing a calibration image projected onto the projection target area by the projection section;

causing the processing section to detect a projection area in the projection target area based on the sensing information to generate projection area information indicating information about a position of the projection area, and detect the projection target area to generate projection target area information indicating information about a position of the projection target area;

causing the processing section to generate projection angle information indicating an angle formed by the projection target area and projection light projected onto the projection target area based on the projection area information and the projection target area information;

causing the processing section to control a driver section which drives the projection section so that an optical axis of the projection light is aligned with a normal direction of the projection target area based on the projection angle information;

causing the processing section to generate lens shift control information for controlling a lens shift section included in the projection section so that an image is projected onto the aim area based on the projection angle information; and causing the processing section to control the lens shift section based on the lens shift control information.

DETAILED DESCRIPTION OF THE EMBODIMENT

Figure 1:
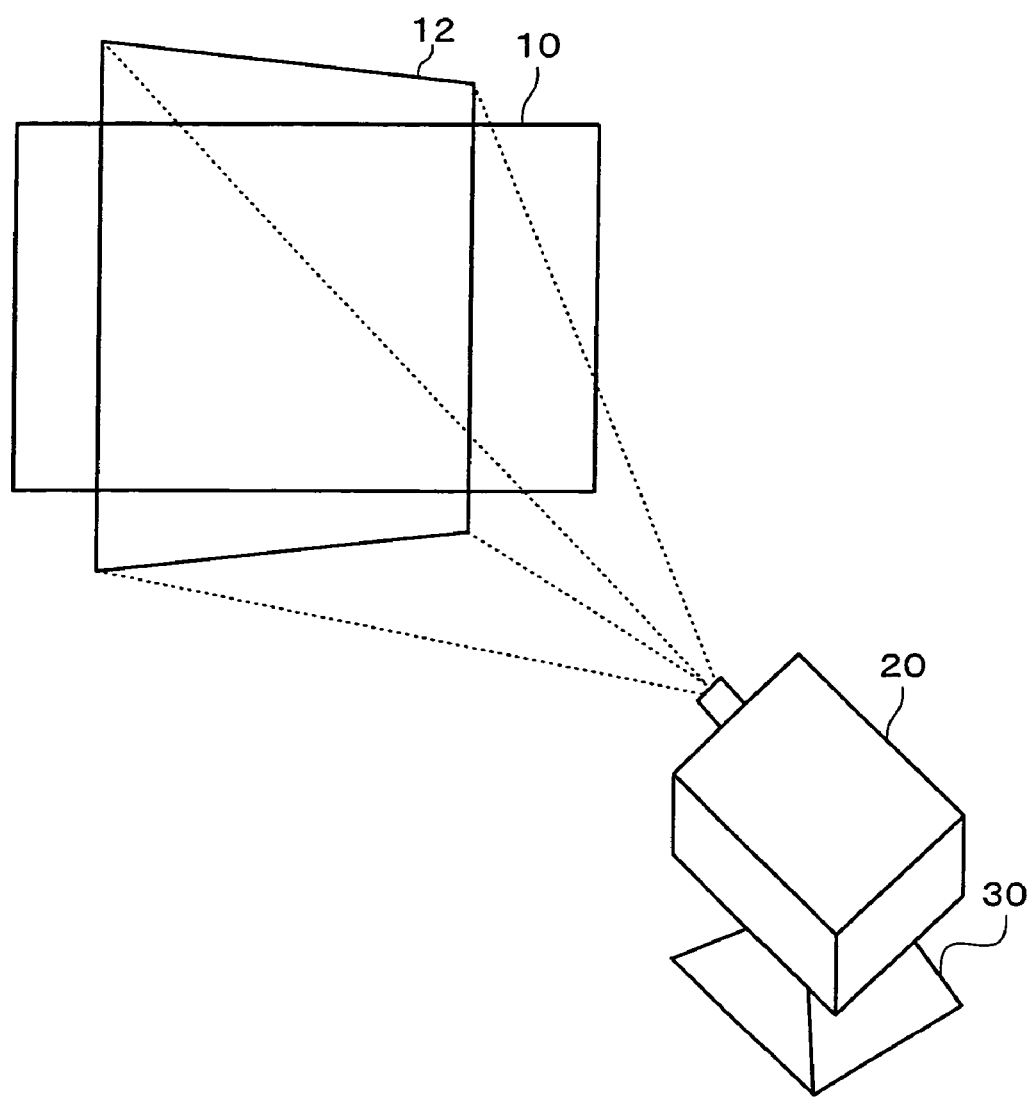
FIG. 1 is a schematic diagram showing an initial image projection state according to one embodiment of the invention.

The invention may provide a projection control system, a projector, and a projection control method capable of reducing deterioration of the image quality caused by image distortion correction and more universally preventing occurrence of image distortion.

A projection control system according to one embodiment of the invention includes:

a projection angle deriving section which generates projection angle information indicating an angle formed by a projection target area and projection light projected onto the projection target area;

a projection distance deriving section which generates projection distance information indicating a distance from an aim area in the projection target area to a projection section which projects the projection light;

a control information generation section which generates direction control information for aligning a projection direction of the projection light with a normal direction of the projection target area based on the projection angle information, and generates projection section control information for controlling the projection section so that the projection light is projected onto the aim area based on the projection distance information;

a driver section which drives a direction adjustment mechanism which adjusts the projection direction of the projection light based on the direction control information; and a control section which controls the projection section based on the projection section control information.

A projector according to one embodiment of the invention includes:

a projection angle deriving section which generates projection angle information indicating an angle formed by a projection target area and projection light projected onto the projection target area;

a projection distance deriving section which generates projection distance information indicating a distance from an aim area in the projection target area to a projection section which projects the projection light;

a control information generation section which generates direction control information for aligning a projection direction of the projection light with a normal direction of the projection target area based on the projection angle information, and generates projection section control information for controlling the projection section so that the projection light is projected onto the aim area based on the projection distance information;

a driver section which drives a direction adjustment mechanism which adjusts the projection direction of the projection light based on the direction control information;

a control section which controls the projection section based on the projection section control information; and the projection section.

A computer-readable program according to one embodiment of the invention causes a computer to function as:

a projection angle deriving section which generates projection angle information indicating an angle formed by a projection target area and projection light projected onto the projection target area;

a projection distance deriving section which generates projection distance information indicating a distance from an aim area in the projection target area to a projection section which projects the projection light;

a control information generation section which generates direction control information for aligning a projection direction of the projection light with a normal direction of the projection target area based on the projection angle information, and generates projection section control information for controlling the projection section so that the projection light is projected onto the aim area based on the projection distance information;

a driver section which drives a direction adjustment mechanism which adjusts the projection direction of the projection light based on the direction control information; and a control section which controls the projection section based on the projection section control information.

An information storage medium according to one embodiment of the invention stores a computer-readable program, the information storage medium storing the above program.

According to the embodiments of the invention, the projector etc. can correct image distortion by aligning the projection direction of the projection light with the normal direction of the projection target area. Moreover, deterioration of the image quality can be reduced by controlling the projection section by means of hardware. According to the embodiments of the invention, since the projector etc. can automatically cause the projection section to face along the normal direction, image distortion can be efficiently corrected without imposing a burden on the user.

According to the embodiments of the invention, the projector etc. can more universally prevent occurrence of image distortion irrespective of the shape of the projection target area.

With the projection control system, projector, program and information storage medium, the projection section may include a lens shift section for projecting the projection light at an arbitrary position;

the projection section control information may include lens shift control information for controlling the lens shift section; and the control section may control the lens shift section based on the lens shift control information.

According to this feature, since the projector etc. can automatically adjust the projection state so that image distortion does not occur by controlling the lens shift section, the user can more simply see an image without deterioration of the image quality.

With the projection control system, projector, program and information storage medium, the projection section may include a focus section for automatically adjusting focus of a projection lens;

the projection section control information may include focus control information for controlling the focus section;

the projection distance deriving section may generate the projection distance information based on an amount of adjustment of the focus section in a state in which the projection lens is automatically focused on the aim area; and the control section may control the focus section based on the focus control information.

This enables the projector etc. to cause the projection section to project an image which deteriorates in image quality to only a small extent by deriving the distance between the aim area and the projection section in a state in which the projector etc. faces along the normal direction and performing the autofocus processing.

Each of the projection control system, projector, program and information storage medium may include:

a sensing section which generates sensing information by sensing an area including the projection target area;

a projection area detection section which detects a projection area in the projection target area based on the sensing information and generates projection area information indicating information about a position of the projection area; and a projection target area detection section which detects the projection target area based on the sensing information and generates projection target area information indicating information about a position of the projection target area; and the projection angle deriving section may generate the projection angle information based on the projection area information and the projection target area information.

This enables the projector etc. to derive the projection angle by determining the difference between the shape of the entirety or a part of the projection target area and the shape of the entirety of a part of the projection area.

With the projection control system, projector, program and information storage medium, the projection section may include a zoom section which adjusts an angle of view of a projection lens for adjusting a size of the projection area;

the projection section control information may include zoom control information for controlling the zoom section;

the control information generation section may generate post-adjustment distance information indicating a distance from the aim area to the projection section after adjustment of the projection direction based on the projection distance information and the projection angle information, and may generate the zoom control information so that the projection area coincides with the aim area based on the projection target area information, the projection angle information, the lens shift control information, and the post-adjustment distance information; and the control section may control the zoom section based on the zoom control information.

This enables the projector etc. to adjust the size of the projection area to a desired size by means of hardware, so that the projection section can project an image which deteriorates in image quality to only a small extent in comparison with the case of adjusting the size of the projection area by means of software.

A projection control method according to one embodiment of the invention includes:

causing a projection section to perform autofocus processing for an aim area in a projection target area;

causing a processing section to generate projection distance information indicating a distance from the projection section to the aim area based on an amount of focus adjustment in the autofocus processing;

causing a sensing section to generate sensing information by sensing a calibration image projected onto the projection target area by the projection section;

causing the processing section to detect a projection area in the projection target area based on the sensing information to generate projection area information indicating information about a position of the projection area, and detect the projection target area to generate projection target area information indicating information about a position of the projection target area;

causing the processing section to generate projection angle information indicating an angle formed by the projection target area and projection light projected onto the projection target area based on the projection area information and the projection target area information;

causing the processing section to control a driver section which drives the projection section so that an optical axis of the projection light is aligned with a normal direction of the projection target area based on the projection angle information;

causing the processing section to generate lens shift control information for controlling a lens shift section included in the projection section so that an image is projected onto the aim area based on the projection angle information; and causing the processing section to control the lens shift section based on the lens shift control information.

According to the embodiment of the invention, the processing section can correct image distortion by aligning the projection direction of the projection light with the normal direction of the projection target area. Moreover, deterioration of the image quality can be reduced by controlling the projection section by means of hardware. According to the embodiment of the invention, since the processing section can automatically cause the projection section to face along the normal direction, the projection state can be efficiently corrected so that image distortion does not occur without imposing a burden on the user.

According to the embodiment of the invention, the processing section can more universally prevent occurrence of image distortion irrespective of the shape of the projection target area.

According to the embodiment of the invention, since the processing section can automatically adjust the projection state so that image distortion does not occur by controlling the lens shift section, the user can more simply see an image without deterioration of the image quality.

This projection control method may include:

causing the processing section to generate post-adjustment distance information indicating a distance from the aim area to the projection section after projection direction adjustment based on the projection distance information and the projection angle information;

causing the processing section to generate zoom control information for controlling a zoom section included in the projection section so that the projection area coincides with the aim area based on the projection target area information, the projection angle information, the lens shift control information, and the post-adjustment distance information; and causing the control section to control the zoom section based on the zoom control information.

This enables the processing section to adjust the size of the projection area to a desired size by means of hardware, so that the projection section can project an image which deteriorates in image quality to only a small extent in comparison with the case of adjusting the size of the projection area by means of software.

The invention is described below with reference to the drawings taking the case of applying the invention to a projector as an example. Note that the embodiments described hereunder do not in any way limit the scope of the invention defined by the claims laid out herein. Note also that not all of the elements of these embodiments should be taken as essential requirements to the means of the present invention.

FIG. 1 is a schematic diagram showing an initial image projection state according to one embodiment of the invention.

A projector 20 projects an image onto a screen 10 having a projection target area. As a result, the entirety or a part of a projected image 12 (projection area) is displayed on the screen 10. In one embodiment of the invention, since the projector 20 is not positioned perpendicularly to the screen 10, the projected image 12 undergoes distortion (keystone distortion), and a part of the projected image 12 is positioned outside the screen 10.

The projector 20 according to one embodiment of the invention includes a pedestal 30 which is one type of direction adjustment mechanism which drives the projector 20 so that the projection angle can be changed.

Figure 2:
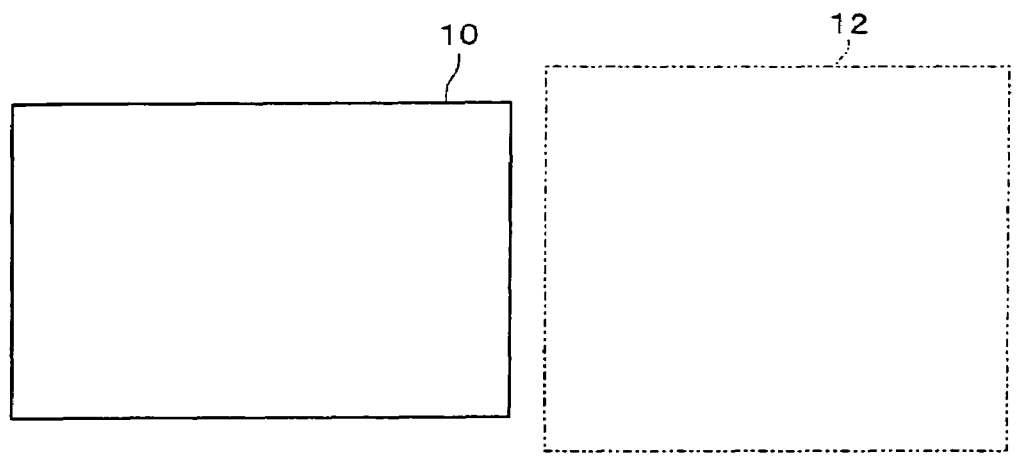
FIG. 2 is a schematic diagram showing the image projection state after projection angle adjustment has been performed according to one embodiment of the invention.
Figure 2:
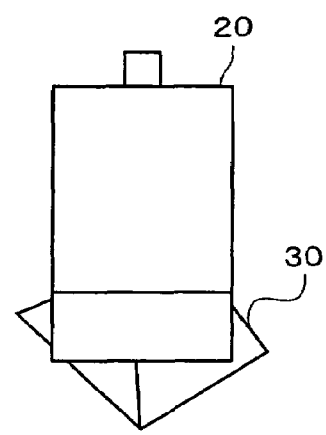

FIG. 2 is a schematic diagram showing an image projection state after projection angle adjustment has been performed according to one embodiment of the invention.

As shown in FIG. 2, the pedestal 30 drives the projector 20 so that the optical axis of the projection light of the projector 20 is aligned with the normal of the screen 10, for example. This eliminates distortion of the projected image 12.

Figure 3:
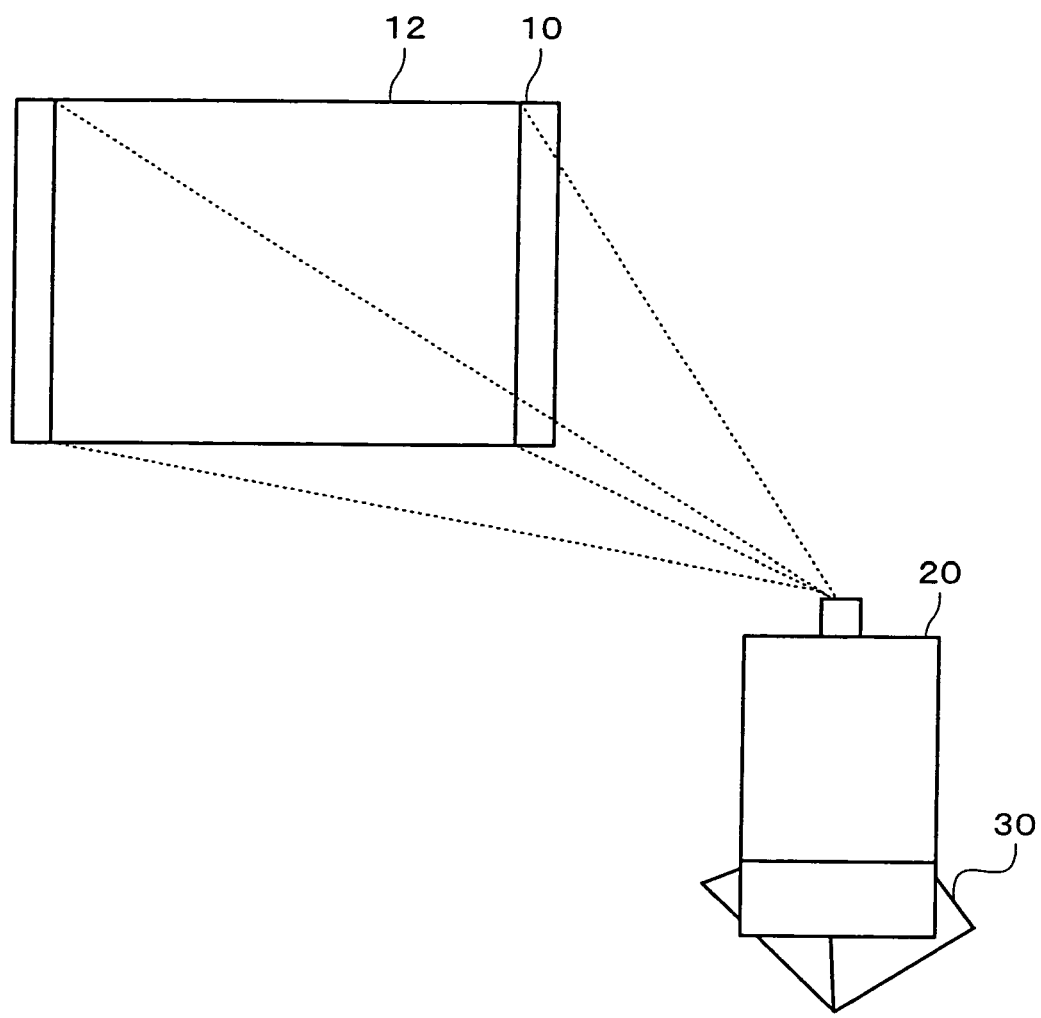
FIG. 3 is a schematic diagram showing an image projection state after a lens shift and angle-of-view adjustment have been performed according to one embodiment of the invention.

FIG. 3 is a schematic diagram showing an image projection state after a lens shift and angle-of-view adjustment have been performed according to one embodiment of the invention.

The projector 20 projects the projected image 12 onto an aim area (area desirable for the user) in the screen 10 by adjusting the projection position of the projected image 12 by a lens shift and adjusting the size of the projected image 12 by angle-of-view adjustment.

The above-described procedure enables the projector 20 to project the projected image 12 without distortion onto the screen 10 while reducing deterioration of the image quality in comparison with software correction.

Functional blocks for implementing such a function by the projector 20 are described below.

Figure 4:
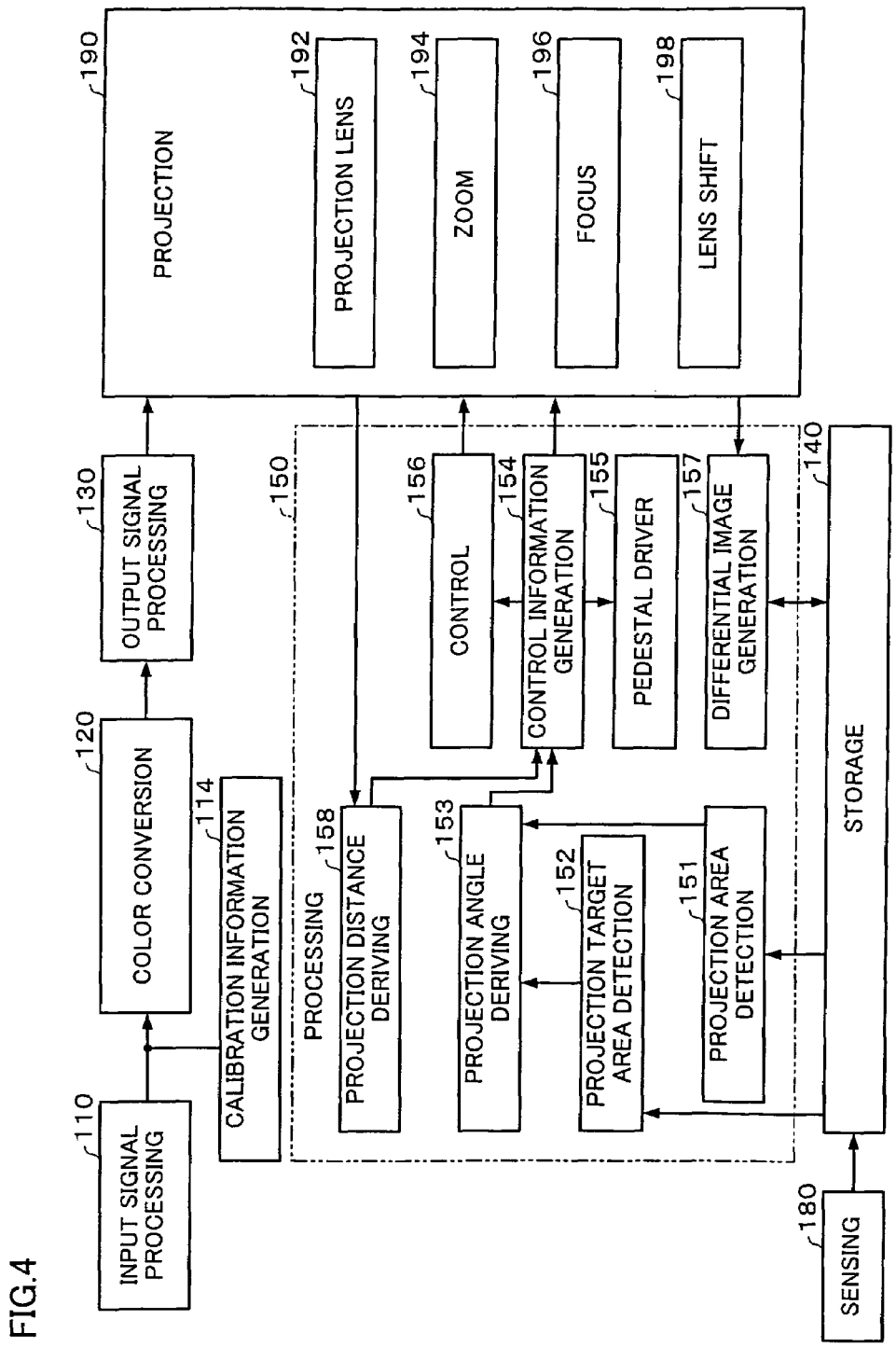
FIG. 4 is a functional block diagram of a projector according to one embodiment of the invention.

FIG. 4 is a functional block diagram of the projector 20 according to one embodiment of the invention.

The projector 20 is configured to include a calibration information generation section 114, an input signal processing section 110 to which an image signal is input from a PC or the like, a color conversion section 120 which adjusts the color and the grayscale of the projected image 12 by correcting the image signal from the input signal processing section 110, an output signal processing section 130 to which the image signal is input from the color conversion section 120, and a projection section 190 to which the image signal is input from the output signal processing section 130.

The projection section 190 is configured to include a projection lens 192 which projects projection light, a zoom section 194 which adjusts the angle of view, a focus section 196 having an autofocus function, and a lens shift section 198 for projecting the projection light at an arbitrary position.

The projector 20 is configured to include a sensing section 180 which generates sensing information by sensing an area including the screen 10, a storage section 140 which stores the sensing information, and a processing section 150 which executes various types of processing.

The processing section 150 is configured to include a differential image generation section 157 which generates a differential image between different types of sensed images based on the sensing information, a projection area detection section 151 which generates projection area information by detecting the projection area based on differential image data based on the sensing information, a projection target area detection section 152 which generates projection target area information by detecting the projection target area based on the differential image data based on the sensing information, and a projection angle deriving section 153 which generates projection angle information indicating an angle formed by the screen 10 and the projection light.

The processing section 150 is configured to include a pedestal driver section 155 which drives the pedestal 30, a control section 156 which controls the zoom section 194, the focus section 196, and the lens shift section 198, a control information generation section 154 which generates projection section control information for controlling the projection section 190 and direction control information for aligning the projection direction of the projection light with the normal direction of the screen 10, and a projection distance deriving section 158 which generates projection distance information indicating the projection distance from the aim area to the projection section 190.

As hardware for implementing the function of each section of the projector 20, the following hardware may be applied, for example.

Figure 5:
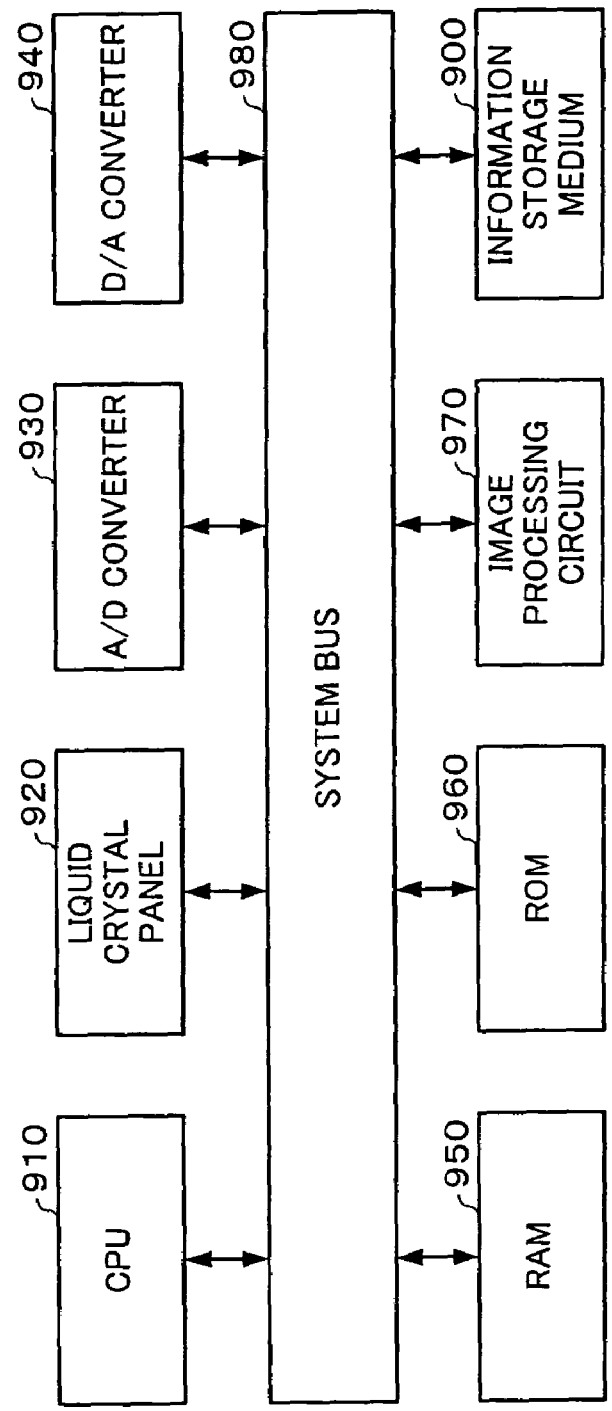
FIG. 5 is a hardware block diagram of a projector according to one embodiment of the invention.

FIG. 5 is a hardware block diagram of the projector 20 according to one embodiment of the invention.

For example, the input signal processing section 110 may be implemented by using an A/D converter 930, an image processing circuit 970, or the like, the storage section 140 may be implemented by using a RAM 950 or the like, the calibration information generation section 114, the color conversion section 120, and the processing section 150 may be implemented by using a CPU 910, the image processing circuit 970, the RAM 950, or the like, the output signal processing section 130 may be implemented by using a D/A converter 940 or the like, the projection section 190 may be implemented by using a liquid crystal panel 920, a ROM 960 which stores a liquid crystal light valve driver which drives the liquid crystal panel 920, or the like, and the sensing section 180 may be implemented by using an area sensor or the like.

These sections can exchange information through a system bus 980.

These sections may be implemented by hardware such as a circuit, or may be implemented by software such as a driver.

The function of the control information generation section 154 or the like may be implemented by a computer by causing the computer to read a program for causing the computer to function as the control information generation section 154 or the like from an information storage medium 900 which stores the program.

As the information storage medium 900, a CD-ROM, DVD-ROM, ROM, RAM, HDD, or the like may be applied. The program read method may be a contact method or a noncontact method.

The above-described functions may be implemented by downloading a program or the like for implementing the above-described functions from a host device or the like through a transmission line instead of reading the program from the information storage medium 900.

The projection control processing by using the above-described sections is described below.

Figure 6:
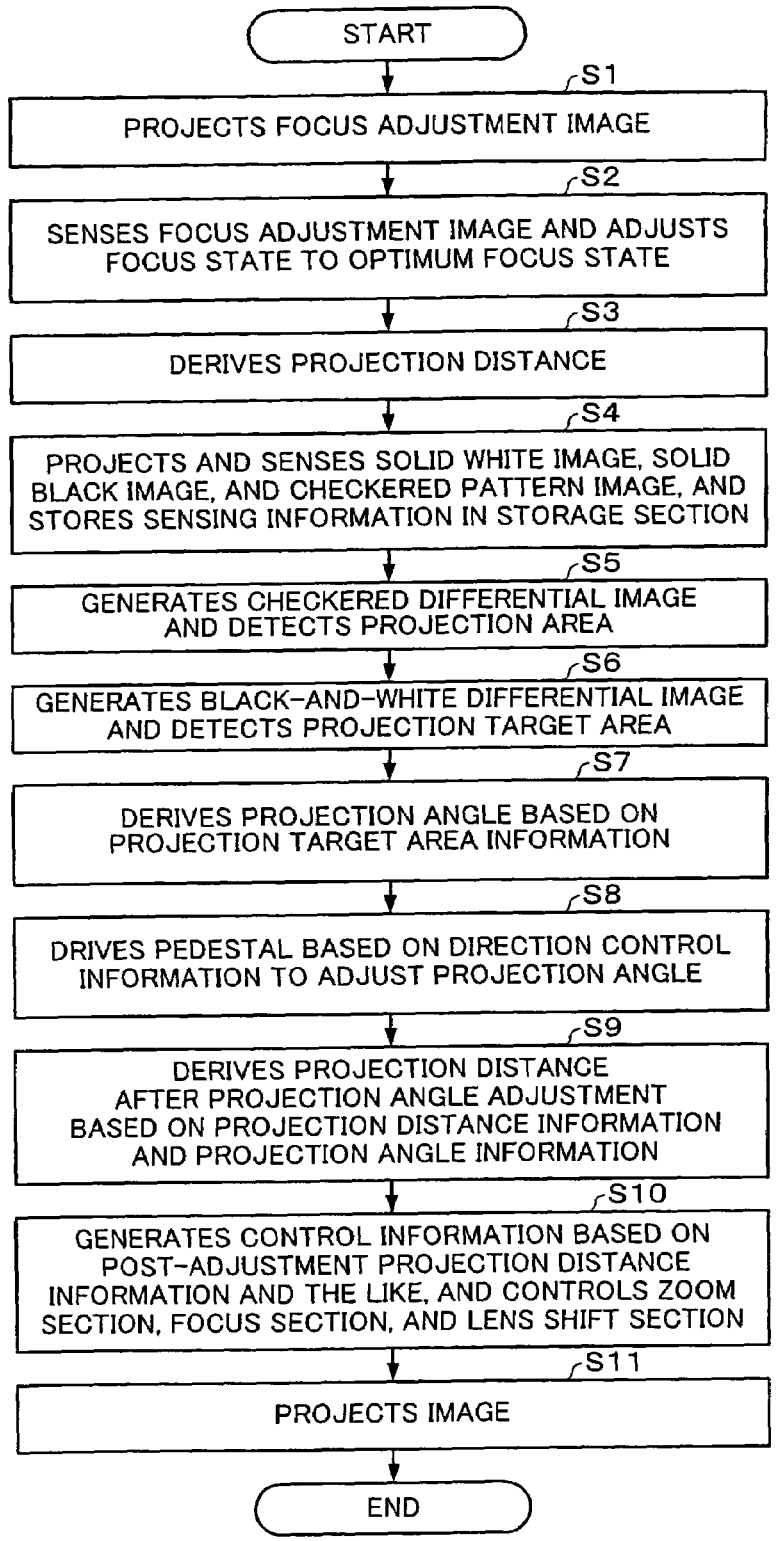
FIG. 6 is a flowchart showing the flow of projection control processing according to one embodiment of the invention.

FIG. 6 is a flowchart showing the flow of the projection control processing according to one embodiment of the invention.

The user provides power to the projector 20 and places the projector 20 so that it faces toward the screen 10. This creates the state shown in FIG. 1, for example. The user then presses an automatic keystone distortion correction button provided in the projector 20.

When the automatic keystone distortion correction button has been pressed, the calibration information generation section 114 generates calibration information for projecting a focus adjustment image. The calibration information is information (e.g. digital RGB signal) similar to image information output from the input signal processing section 110.

The projection section 190 projects the focus adjustment image based on the calibration information from the output signal processing section 130 (step S1).

Figure 7:
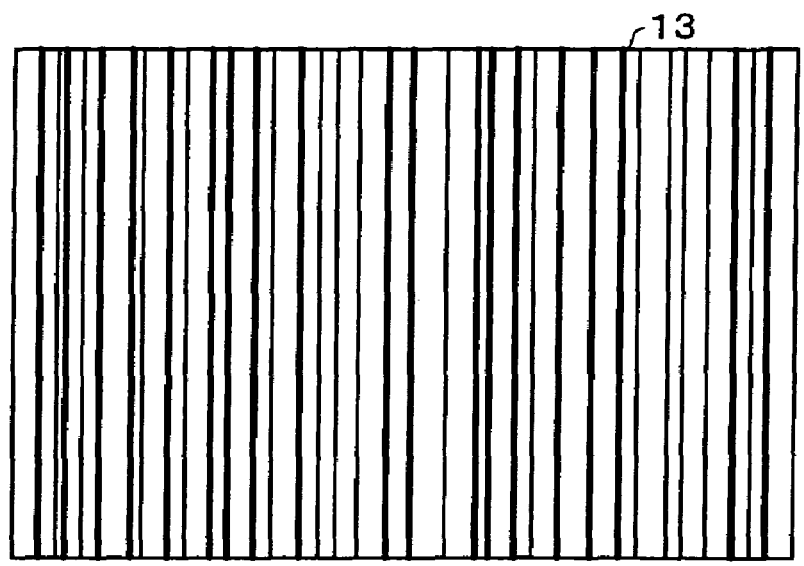
FIG. 7 is a diagram showing a focus adjustment image.

FIG. 7 is a diagram showing a focus adjustment image 13.

The focus adjustment image 13 is an image containing high-frequency components, and has a plurality of lines as shown in FIG. 7, for example.

The sensing section 180 generates focus adjustment sensing information by sensing the projected focus adjustment image 13, and the storage section 140 stores the sensing information.

The control section 156 adjusts the focus state by driving the focus section 196 based on the sensing information so that an optimum state (state in which the high-frequency components are most intensely recognized in the sensing information, that is, a state in which the difference in luminance value between the adjacent pixels is maximum) is obtained (step S2).

The projection distance deriving section 158 derives the projection distance from the projection section 190 to the screen 10 based on the control amount of the focus section 196 by the control section 156 and generates projection distance information indicating the distance (step S3). In more detail, the projection distance deriving section 158 derives the distance by using a table, in which the amount of control is associated with the projection distance, and a function, for example.

The calibration information generation section 114 generates solid white image (entire image is white) calibration information, solid black image (entire image is black) calibration information, and checkered pattern image calibration information. The projection section 190 sequentially projects a solid white image, a solid black image, and a checkered pattern image.

The sensing section 180 generates sensing information by sequentially sensing the projected solid white image, solid black image, and checkered pattern image 14, and the storage section 140 stores the sensing information (step S4).

Figure 8:
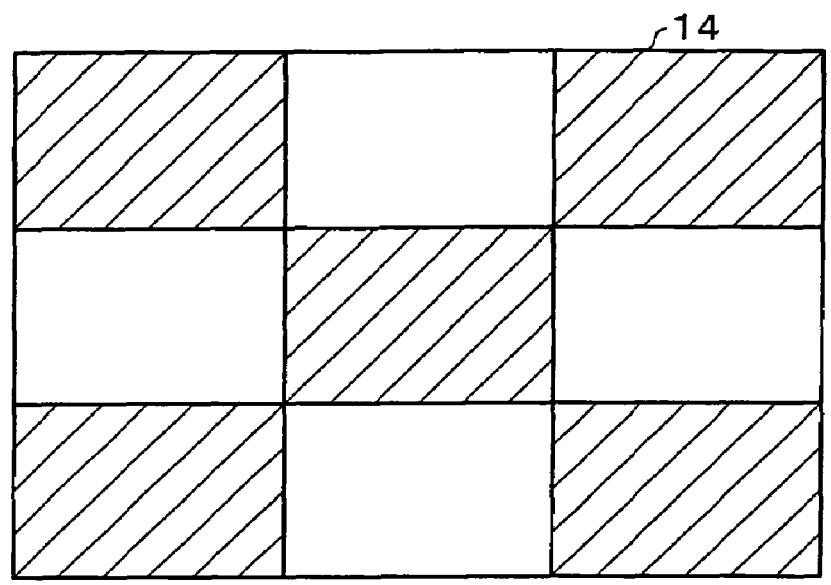
FIG. 8 is a diagram showing a checkered pattern image.

FIG. 8 is a diagram showing the checkered pattern image 14.

The checkered pattern image 14 is a pattern image in a checkered pattern in which, when the entire image is equally divided into nine blocks, the center block area and four peripheral block areas at the four corners are black and the remaining block areas are white.

The sensing section 180 senses the solid white image on the screen 10 at an automatic exposure setting to generate first sensing information. The storage section 140 stores the first sensing information.

The sensing section 180 senses the solid black image on the screen 10 at the exposure used when sensing the solid white image to generate second sensing information. The storage section 140 stores the second sensing information.

The sensing section 180 senses the checkered pattern image 14 on the screen 10 at the exposure used when sensing the solid white image to generate third sensing information. The storage section 140 stores the third sensing information.

The differential image generation section 157 generates a checkered differential image which is the differential image between the solid white image and the checkered pattern image 14 based on the first sensing information and the third sensing information. The projection area detection section 151 detects the projection area in the sensed image by detecting the reference positions of the center block area and the peripheral block areas based on the checkered differential image to generate projection area information which is information on the position of the projection area (step S5).

The differential image generation section 157 generates a black-and-white differential image which is the differential image between the solid white image and the solid black image based on the first sensing information and the second sensing information. The projection target area detection section 152 detects the projection target area in the sensed image by performing edge detection or the like based on the black-and-white differential image to generate projection target area information which is information on the position of the projection target area (step S6).

The projection angle deriving section 153 derives the normal vector of the screen 10 from the three-dimensional coordinates of the screen 10 based on the projection target area information, and derives the projection angle which is the angle formed by the screen 10 (aim area) and the projection light of the projector 20 based on the normal vector to generate projection angle information indicating the projection angle (step S7).

A specific detection method for the projection area and the projection target area is described in Japanese Patent Application No. 2004-156273, and a specific projection angle deriving method is described in Japanese Patent Application No. 2004-78412.

The control information generation section 154 generates direction control information for driving the pedestal 30 so that the projector 20 faces along the normal direction of the screen 10 based on the projection angle information.

The pedestal driver section 155 drives the pedestal 30 based on the direction control information to adjust the projection angle of the projector 20 (step S8). This causes the projector 20 to face along the normal direction of the screen 10, as shown in FIG. 2.

The control information generation section 154 derives the distance between the aim area and the projection section 190 after projection angle adjustment based on the projection distance information and the projection angle information to generate post-adjustment projection distance information indicating the projection distance (step S9).

The control information generation section 154 generates focus control information for controlling the focus section 196 so that the projector 20 is focused on the aim area after projection angle adjustment based on the post-adjustment projection distance information.

The control information generation section 154 generates lens shift control information for controlling the lens shift section 198 so that the projector 20 can project the projected image 12 onto the aim area after projection angle adjustment based on the post-adjustment projection distance information and the projection angle information.

The control information generation section 154 generates zoom control information for controlling the zoom section 194 so that the projected image 12 is projected by effectively utilizing the frame of the screen 10 after projection angle adjustment based on the projection target area information, the projection angle information, the lens shift control information, and the post-adjustment projection distance information.

The control section 156 controls the zoom section 194 based on the zoom control information, controls the focus section 196 based on the focus control information, and controls the lens shift section 198 based on the lens shift control information (step S10).

The projection section 190 projects a normal image after the lens shift section 198 and the like have been controlled (step S11).

This enables the projected image 12 to be projected without distortion while effectively utilizing the frame of the screen 10, as shown in FIG. 3

As described above, according to one embodiment of the invention, the projector 20 can reduce deterioration of the image quality and project a more appropriate image by adjusting the projection state so that image distortion does not occur by controlling the lens shift section 198 and the like by using the projection section control information (lens shift control information, focus control information, and zoom control information) instead of correcting image distortion by correcting the image signal.

According to one embodiment of the invention, since the projector 20 can derive the normal direction of the screen 10 based on the sensing information and is provided with the pedestal 30 which drives the projector 20, the projection light can be automatically aligned with the normal direction of the screen 10.

Therefore, the projector 20 can project an undistorted image without imposing a burden on the user.

According to one embodiment of the invention, the projector 20 can project an image at a desired aspect ratio while effectively utilizing the frame of the screen 10. Moreover, the projector 20 can perform the autofocus processing after adjusting the projection angle. Therefore, the projector 20 can project a finer image.

According to one embodiment of the invention, the projector 20 can generate the first sensing information at an environment-compliant exposure by generating the first sensing information by sensing the solid white image at an automatic exposure setting. The projector 20 can generate the second sensing information and the third sensing information at an exposure suitable for generating the differential image by generating the second sensing information and the third sensing information at the exposure used when sensing the solid white image.

In particular, the sensing section 180 can sense an image by effectively utilizing the dynamic range of the sensing section 180 by sensing the solid white image at an automatic exposure setting in comparison with the case of sensing an image at a fixed exposure, even when the screen 10 is affected by external light, when the reflected projection light is too weak due to large projection distance or low reflectance of the screen 10, or when the reflected projection light is too strong due to small projection distance or high reflectance of the screen 10.

The preferred embodiments to which the invention is applied are described above. However, the application of the invention is not limited to the above-described embodiments.

For example, when it suffices to change the projection direction only in the vertical direction, the projector 20 may be provided with an inclination sensor, and the projection angle deriving section 153 may derive the projection angle based on the value output from the inclination sensor. In this case, the projection target area detection section 152 is unnecessary.

When image distortion cannot be corrected only by a lens shift, the projector 20 may utilize image signal correction and a lens shift in combination. This enables the projector 20 to project an image in a significantly oblique direction.

When the projector 20 can project an appropriate image merely by adjusting the projection direction by using the pedestal 30, the zoom section 194, the focus section 196, the lens shift section 198, and control of these sections are unnecessary.

A luminance peak position detection section may be provided instead of the projection target area detection section 152, or the projection target area detection section 152 and the luminance peak position detection section may be used in combination. When the projection target area cannot be detected by using the projection target area detection section 152 (e.g. when the projection target area does not have a boundary line, such as a wall), the projection angle may be derived by using the luminance peak position detection section. The luminance peak position used herein refers to the position of a pixel having the maximum luminance value among the pixels making up the projection area in the sensed image, for example.

When using the luminance peak position detection section, a pattern image having white gradation (e.g. image in which the center of the image is the darkest and the periphery of the image is the brightest) as a luminance peak position detection calibration image. This enables the projector 20 to more appropriately detect the luminance peak position by reducing an effect caused by the difference in lamp light intensity.

When using the luminance peak position detection section, the sensed solid white image, the black-and-white differential image, or the like may be used as the luminance peak position detection image. A specific method of deriving the projection angle by using the luminance peak position detection section is described in Japanese Patent Application No. 2004-150081.

A distance sensor (e.g. ultrasonic sensor or phase-difference sensor) may be used as the projection distance deriving section, and the control information generation section 154 may generate the projection distance information based on the value output from the distance sensor.

The projector 20 may include an external light effect removal section or a noise removal section, and the external light effect removal section or the noise removal section may remove an effect of external light or noise contained in the sensing information or differential image data.

In the above-described embodiments, the projector 20 generates the projection target area information and the projection area information by using the differential image. However, the projector 20 may generate the projection target area information or the like without using the differential image. In more detail, the projection area detection section 151 or the projection target area detection section 152 may detect the boundary line of the projection area or the projection target area in the sensed image by performing edge detection for the sensed image.

The first or second sensing information may be generated by causing the sensing section 180 to sense the screen 10 in a state in which the projection section 190 projects planar light onto the screen 10 when the image signal is not input. Specifically, the projector 20 need not necessarily project the solid white image or the solid black image.

The positional relationship between the projected image 12 and the screen 10 is not limited to the example shown in FIG. 1. For example, the entire outer frame of the projected image 12 may be positioned either outside or inside of the outer frame of the screen 10.

The checkered pattern image 14 is not limited to that described in the above-described embodiments. For example, the checkered pattern image 14 may be an image which causes the checkered differential image to have a pattern similar to the pattern of the checkered pattern image 14.

The solid white image, the solid black image, and the checkered pattern image 14 may be projected or sensed in an arbitrary order. For example, the projector 20 may perform the control processing after projecting the checkered pattern image 14 or a position confirmation image and allowing the user to confirm whether or not the center block area (rectangular center area of the checkered pattern image 14) is positioned inside the screen 10.

The invention is also effective even when projecting an image onto a projection target other than the screen 10, such as a blackboard or a whiteboard.

As the projector 20, a projector using a digital micromirror device (DMD) or the like may be used instead of a liquid crystal projector. DMD is a trademark of Texas Instruments, Inc. (U.S.A.).

The above-described functions of the projector 20 may be implemented by only the projector, or may be distributed over a plurality of processing devices (e.g. distribution processing of the projector and the PC).

The function of the projection control system may be separated from the projector 20 and provided in a pedestal including a CPU or the like, so that the pedestal including a CPU or the like may be caused to function as the projection control system.

The projector 20 may be used in a state in which the projector 20 is hung from the ceiling, and metal fittings or the like may be used as the direction adjustment mechanism.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. A projection control system, comprising:
   a projection angle deriving section which generates projection angle information indicating an angle formed by a projection target area and projection light projected onto the projection target area;
   a projection distance deriving section which generates projection distance information indicating a distance from an aim area in the projection target area to a projection section which projects the projection light;
   a control information generation section which generates direction control information for aligning a projection direction of the projection light with a normal direction of the projection target area based on the projection angle information, and generates projection section control information for controlling the projection section so that the projection light is projected onto the aim area based on the projection distance information;
   a driver section which drives a direction adjustment mechanism which adjusts the projection direction of the projection light based on the direction control information;
   a control section which controls the projection section based on the projection section control information;
   a sensing section which generates sensing information by sensing an area including the projection target area;
   a projection area detection section which detects a projection area in the projection target area based on the sensing information and generates projection area information indicating information about a position of the projection area; and
   a projection target area detection section which detects the projection target area based on the sensing information and generates projection target area information indicating information about a position of the projection target area,
   wherein the projection angle deriving section generates the projection angle information based on the projection area information and the projection target area information.

2. The projector as defined in claim 1,
   wherein the projection section includes a zoom section which adjusts an angle of view of a projection lens for adjusting a size of the projection area;
   wherein the projection section control information includes zoom control information for controlling the zoom section;
   wherein the control information generation section generates post-adjustment distance information indicating a distance from the aim area to the projection section after adjustment of the projection direction based on the projection distance information and the projection angle information, and generates the zoom control information so that the projection area coincides with the aim area based on the projection target area information, the projection angle information, the lens shift control information, and the post-adjustment distance information; and wherein the control section controls the zoom section based on the zoom control information.

3. A projector comprising:
a projection angle deriving section which generates projection angle information indicating an angle formed by a projection target area and projection light projected onto the projection target area;
a projection distance deriving section which generates projection distance information indicating a distance from an aim area in the projection target area to a projection section which projects the projection light;
a control information generation section which generates direction control information for aligning a projection direction of the projection light with a normal direction of the projection target area based on the projection angle information, and generates projection section control information for controlling the projection section so that the projection light is projected onto the aim area based on the projection distance information;
a driver section which drives a direction adjustment mechanism which adjusts the projection direction of the projection light based on the direction control information;
a control section which controls the projection section based on the projection section control information;
the projection section;
a sensing section which generates sensing information by sensing an area including the projection target area;
a projection area detection section which detects a projection area in the projection target area based on the sensing information and generates projection area information indicating information about a position of the projection area; and
a projection target area detection section which detects the projection target area based on the sensing information and generates projection target area information indicating information about a position of the projection target area,
wherein the projection angle deriving section generates the projection angle information based on the projection area information and the projection target area information.

4. The projector as defined in claim 3,
wherein the projection section includes a lens shift section for projecting the projection light at an arbitrary position;
wherein the projection section control information includes lens shift control information for controlling the lens shift section; and
wherein the control section controls the lens shift section based on the lens shift control information.

5. The projector as defined in claim 3,
wherein the projection section includes a focus section for automatically adjusting focus of a projection lens;
wherein the projection section control information includes focus control information for controlling the focus section;
wherein the projection distance deriving section generates the projection distance information based on an amount of adjustment of the focus section in a state in which the projection lens is automatically focused on the aim area; and
wherein the control section controls the focus section based on the focus control information.

6. A projection control method, comprising:
causing a projection section to perform autofocus processing for an aim area in a projection target area;
causing a processing section to generate projection distance information indicating a distance from the projection section to the aim area based on an amount of focus adjustment in the autofocus processing;
causing a sensing section to generate sensing information by sensing a calibration image projected onto the projection target area by the projection section;
causing the processing section to detect a projection area in the projection target area based on the sensing information to generate projection area information indicating information about a position of the projection area, and detect the projection target area to generate projection target area information indicating information about a position of the projection target area;
causing the processing section to generate projection angle information indicating an angle formed by the projection target area and projection light projected onto the projection target area based on the projection area information and the projection target area information;
causing the processing section to control a driver section which drives the projection section so that an optical axis of the projection light is aligned with a normal direction of the projection target area based on the projection angle information;
causing the processing section to generate lens shift control information for controlling a lens shift section included in the projection section so that an image is projected onto the aim area based on the projection angle information; and
causing the processing section to control the lens shift section based on the lens shift control information.

7. The projection control method as defined in claim 6, comprising:
causing the processing section to generate post-adjustment distance information indicating a distance from the aim area to the projection section after projection direction adjustment based on the projection distance information and the projection angle information;
causing the processing section to generate zoom control information for controlling a zoom section included in the projection section so that the projection area coincides with the aim area based on the projection target area information, the projection angle information, the lens shift control information, and the post-adjustment distance information; and
causing the control section to control the zoom section based on the zoom control information.

8. A projector, comprising:
a projection section which projects projection light;
a projection angle deriving section which generates projection angle information indicating an angle formed by a projection target area and the projection light projected onto the projection target area;
a projection distance deriving section which generates projection distance information indicating a distance from an aim area in the projection target area to the projection section;
a control information generation section which generates direction control information for aligning a projection direction of the projection light with a normal direction of the projection target area based on the projection angle information, and generates projection section control information for controlling the projection section so that the projection light is projected onto the aim area based on the projection distance information;

a direction adjustment mechanism which adjusts the projection direction of the projection light;

a driver section which drives the direction adjustment mechanism based on the direction control information;

a control section which controls the projection section based on the projection section control information;

a sensing section which generates sensing information by sensing an area including the projection target area;

a projection area detection section which detects a projection area in the projection target area based on the sensing information and generates projection area information indicating information about a position of the projection area; and a projection target area detection section which detects the projection target area based on the sensing information and generates projection target area information indicating information about a position of the projection target area, wherein the projection angle deriving section generates the projection angle information based on the projection area information and the projection target area information.

* * * * *